May 23, 1939. A. W. LE FEVRE ET AL 2,159,389
ELECTRIC SPEEDOMETER
Filed Sept. 14, 1935 2 Sheets-Sheet 2
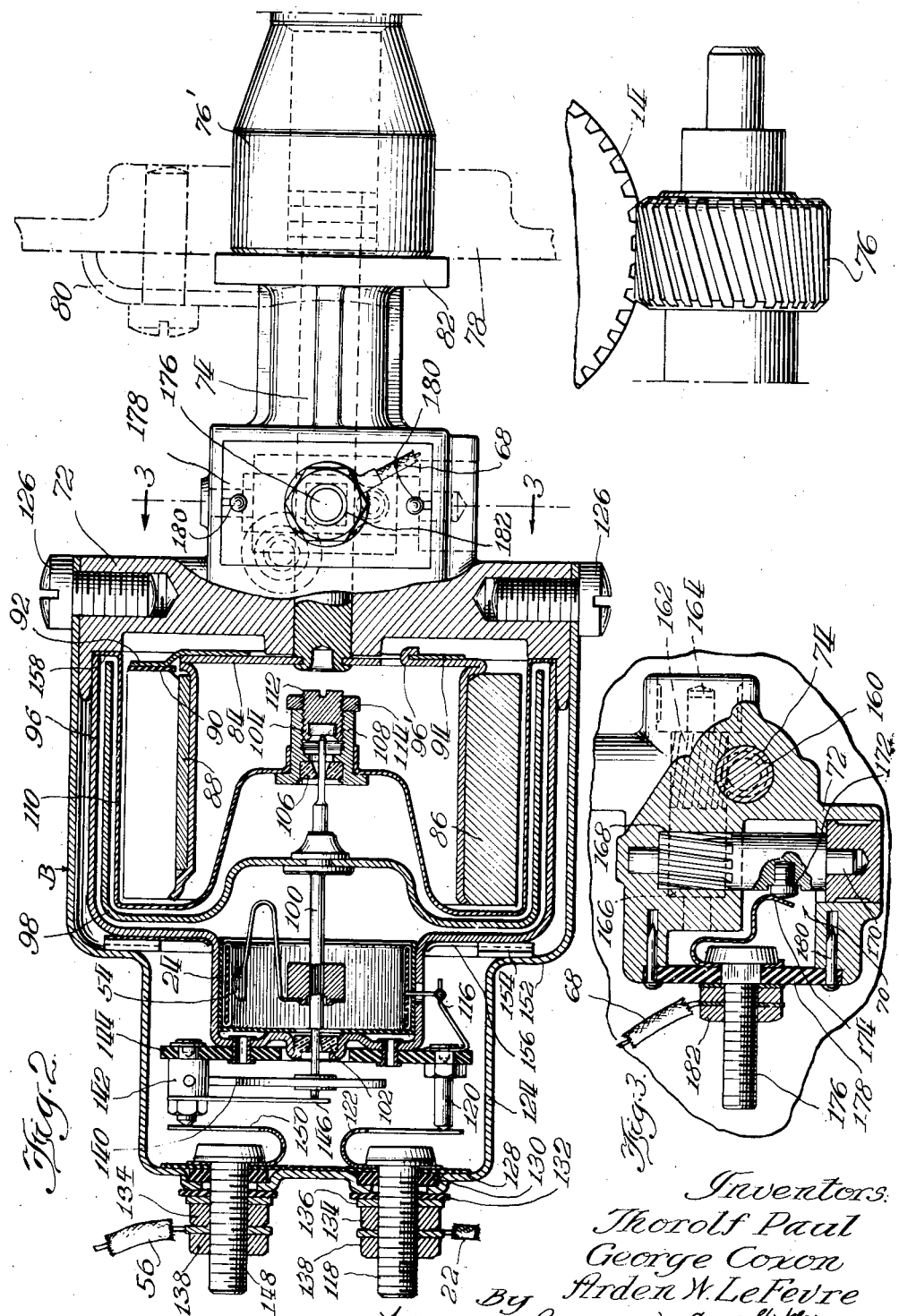

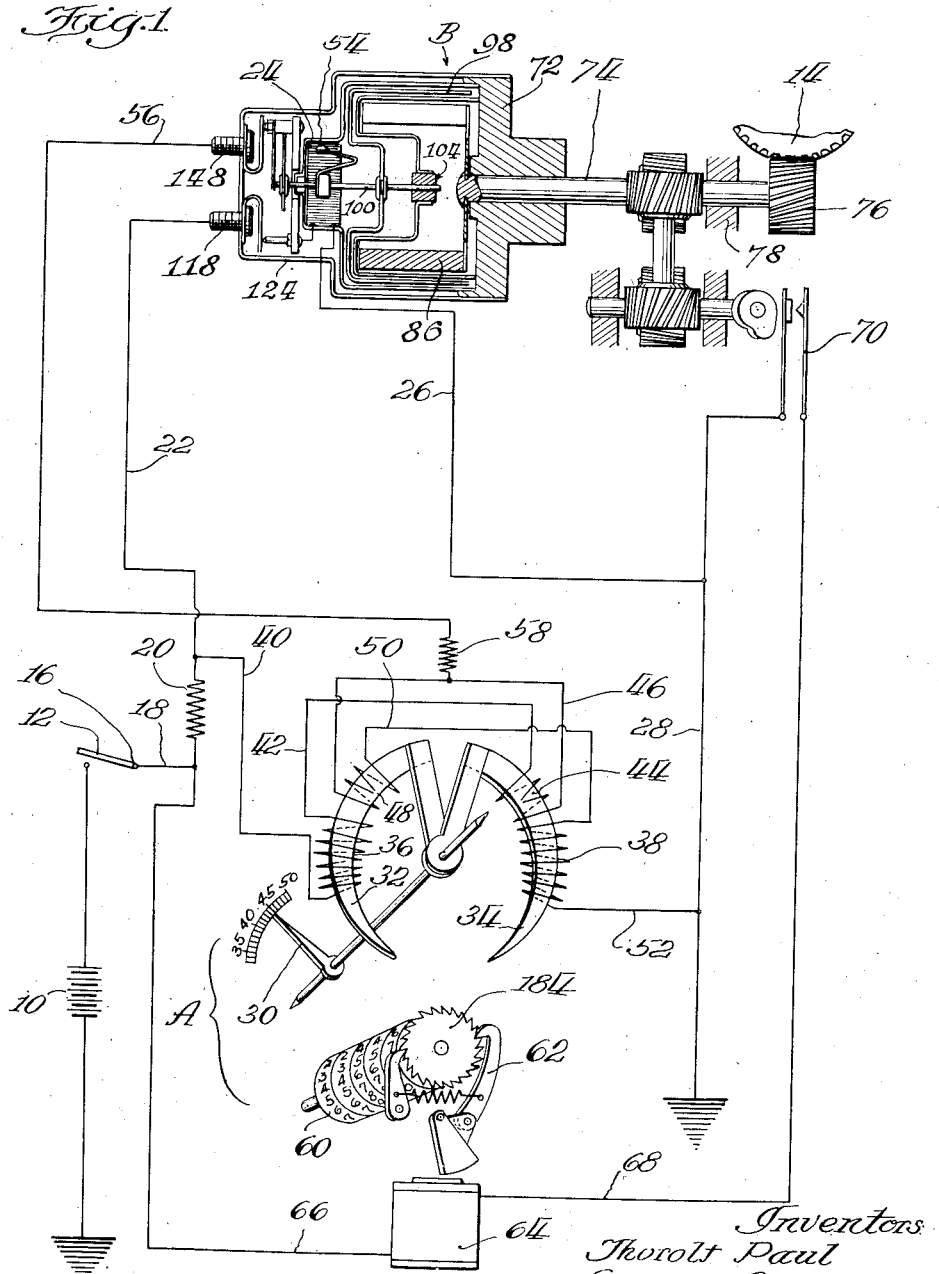

Patented May 23, 1939

2,159,389

UNITED STATES PATENT OFFICE 2,159,389

ELECTRIC SPEEDOMETER

Arden W. Le Fevre and Thorolf Paul, Chicago, and George E. Coxon, Cicero, Ill., assignors to Stewart-Warner Corporation, Chicago, Ill., a corporation of Virginia Application September 14, 1935, Serial No. 40,600

19 Claims. (Cl. 175—183)

Our invention pertains to electric speedometers particularly adapted for automobiles in which the engine is located at the rear of the vehicle, and is an improvement on the electric speedometer disclosed in application, Serial No. 754,522, filed November 23, 1934.

An object of our invention is to provide an improved electric speedometer.

Another object is to provide an electric speedometer which more accurately indicates the true speed of the vehicle at all times.

Another object of our invention is to provide an electric speedometer which is simple and which will be free from operating difficulties.

Another object is to provide an electric speedometer which is economical to manufacture.

Other objects and advantages will become apparent as the description proceeds.

In the drawings, Figure 1 is a diagrammatic representation of our electric speedometer, showing the manner in which this speedometer is connected into the electrical circuit of which it forms a part;

Figure 2 is an enlarged view of the translating mechanism which converts speed variations into electrical current variations; and Figure 3 is a sectional view taken on the line 3—3 of Figure 2.

Referring to Figure 1 of the drawings, we have indicated our electric speedometer as being connected into the electrical circuit of an automobile having the usual battery 10 and ignition switch 12, and also having a gear 14 which always rotates in unison with the rear wheels of the vehicle. The electric speedometer comprises in general an indicating means A which is preferably mounted on the instrument board of the automobile, and a translating means B which is driven from the gear 14 and which is usually attached to the automobile transmission housing.

The ignition switch 12 includes a contact 16 which is disconnected from the battery 10 when the ignition switch is open. It is to be understood that this contact 16 is connected to the usual ignition circuit of the automobile engine. This contact 16 is also connected to a wire 18 leading to a ballast resistance 20. The other side of this ballast resistance is connected by a wire 22 to a resistance 24 which is grounded by means of wires 26 and 28.

The pointer 30 is controlled by a pair of tapered armatures 32 and 34 which are acted upon by electromagnets 36 and 38, respectively. The electromagnets 36 and 38 are connected in series and are connected in the circuit in parallel with the resistance 24. A wire 40 connects ballast resistance 20 with one terminal of electromagnet 36. The other terminal of electromagnet 36 is connected by wire 42 with one terminal of a heating coil 44 associated with the other electromagnet 38 in heat-transmitting relationship thereto but electrically separate therefrom. The other terminal of heating coil 44 connects through wire 46 with a second heating coil 48 associated with electromagnet 36 to transmit heat thereto but insulated therefrom. A wire 50 connects the other terminal of heating coil 48 with one terminal of the magnet 38, the other terminal of this magnet being grounded through wires 52 and 28.

A slider 54 moves over the resistance 24 in conformity with the speed of the automobile to vary the magnetic forces exerted by the magnets 36 and 38 and thereby control the position of the pointer 30. The slider 54 is in electrical communication with a wire 56 leading to a ballast resistance 58 which is connected to the wire 46 at a point electrically intermediate the magnets 36 and 38, whereby shifting the position of the slider 54 shifts the relative values of the currents passing through the magnets 36 and 38.

Our electrical speedometer also incorporates a mileage indicator 60 which may be of the usual drum type. This indicator is driven through a pawl 62 controlled by an electromagnet 64 communicating with wire 18 and battery 10 through a wire 66. Wire 68 connects magnet 64 with a contact switch 70 which is closed at predetermined distance intervals by suitable mechanism driven from the gear 14. The switch 70 is grounded through wire 28 so that the magnet 64 is connected in parallel with the resistance 24 and with the magnets 36 and 38.

The mechanism for controlling the position of the slider 54 is shown most clearly in Figure 2 of the drawings. This mechanism comprises a die casting 72 carrying a magnet shaft 74 rotatably journalled therein. This magnet shaft has a suitable gear 76 which meshes with and is driven by the gear 14 which is usually mounted on the transmission end of the propeller shaft of the vehicle. The die casting 72 has a portion 76' which extends into a suitable opening provided in the transmission housing 78, the assembly being held in position by a clamp 80 which engages a flange 82 provided by the die casting. This flange serves the further purpose of preventing dirt or moisture from passing into the opening in the transmission housing 78 in which the extension 76' is located.

The upper end of the magnet shaft 74 has affixed thereto a cup-shaped magnet support 84 to which is attached a permanent magnet 86 bent into the form of an annulus but having its ends separated by a suitable gap which may either be left open or which may be filled with non-magnetic material, as desired. Across the ends of the magnet is a temperature compensator 88, and we also preferably provide a magnetic by-pass regulator 90 which may be adjusted to calibrate the instrument. This bypass regulator 90 is held in place by the finger 92 formed on an annular plate 94 which is clamped to the support 84 by bent-over fingers 96' punched out of the material of the support 84.

Surrounding the magnet 86 and spaced therefrom is an iron field plate 96 which forms a strong magnetic field between itself and the magnet 86. In this space is located a speed cup 98 formed of aluminum or other suitable material. This speed cup is mounted on a shaft 100 which has one end journalled in a jewelled bearing 102 carried by the upper end of the iron field plate 96. This jewelled bearing 102 insulates the shaft 100 from the field plate 96. The other end of the shaft 100 rests upon a jewel 104 which carries the weight of the shaft 100 and speed cup 98 when the translating mechanism is assembled in normal position with the shaft 100 substantially vertical and the jewel 104 at the lower end thereof. A second jewel 106 forms a guide for the shaft 100 and restricts lateral movement thereof. Both of the jewels 104 and 106 are located in a housing 108 carried by a combined bearing support and oil shield 110 which is made of brass or other electromagnetic material. A screw 112 permits adjustment of the jewel 104 and is locked in adjusted position by a nut 114.

The shaft 100 carries the slider 54 which moves over the resistance 24 mounted in the upper end of the iron field plate 96. One end of the resistance 24 is grounded to this iron field plate and the other end is connected to a contact 116 which is in electrical communication with a terminal 118 through stud 120 and spring 122. The terminal 118 is carried by the upper end of a cover 124 which is attached to the die casting 72 by screws 126. The cover 124 may be made of any suitable sheet material, such, for example, as iron, and the contact 118 is insulated therefrom by disks 128, 130 and 132 of fiber, rubber, or other suitable insulating material.

A nut 134 and metal washer 136 clamp the contact 118 and insulating disk 128, 130 and 132 to the upper end of the cover 124. A second nut 138 clamps in place the terminal attached to the end of wire 22 which connects the resistance 24 with the ballast 20 and battery 10 of the electrical circuit.

The rotation of the magnet 86 tends to rotate the speed cup 98 in the same direction. This rotation of the speed cup, together with its shaft 100 and slider 54, is resisted by a spring 140 which has one end attached to the shaft 100 and a second end attached to a post 142. The post 142 and stud 120 are both mounted on overhanging ends of an insulating plate 144 riveted to the upper end of the field plate 96. The slider 54 and shaft 100 are in electrical communication with the post 142 through spring 140 and also through a contact member 146 which bears lightly against the upper end of the shaft 100. When the translating mechanism is mounted with the shaft 100 in vertical position, this contact member 146 and the weight of the shaft itself and of the speed cup 98, suffice to hold the lower end of the shaft 100 against the jewel 104, but where it is desired to so position the translating mechanism that the shaft 100 is not in this vertical position, it is to be understood that a second jewel similar to the jewel 104 will be utilized to limit longitudinal movement of the shaft 100.

The post 142 is electrically connected to a second terminal 148 through a spring 150. This post 148 is insulated from the cover 124 in the same manner in which the post 118 is insulated from this cover. Attached to the post 148 is one end of the wire 56 which connects the slider 54 with the circuit, including the magnets 36 and 38, at a point electrically intermediate these magnets. The wire, indicated by the reference numeral 26 in the diagrammatic showing of Figure 1 of the drawings, is made unnecessary by the grounding of one end of the resistance 24 to the iron field plate 96.

The cover 124 has an annular shoulder 152 which is located above a similar shoulder provided by the iron field plate 96. Between these two shoulders is clamped a corrugated spacing ring 154 provided with inwardly directed fingers 156 which accurately locate the spacing ring 154. By means of this structure the cover 124 clamps in place on the base of the die casting 72 the iron field plate 96, and this field plate in turn overlies the outwardly directed flange 158 formed at the lower end of the bearing support 110 whereby the latter is also clamped against the base of the die casting 72. The cover 124, iron field plate 96, bearing support 110, and shaft 100 with its associated speed cup 98, can all be removed by simply unscrewing the screws 126. This structure greatly simplifies assembly of the mechanism when it is originally manufactured and also facilitates inspection and repair.

In Figure 3 we have illustrated in detail the mechanism for controlling the operation of the mileage indicator 60. Referring to this figure, it will be seen that the magnet shaft 74 is provided with a gear 160 which meshes with a gear 162 on a cross-shaft 164. This cross-shaft 164 carries a second gear 166 which meshes with a gear 168 on a stub shaft 170. The stub shaft 170 is grounded and carries a contact 172 which forms the movable contact of the switch 70 in the circuit of magnet 64. The other contact 174 is a strip of spring metal clamped beneath the head of a terminal 176 which is attached to a plate 178 of insulating material attached to the die casting 72 by suitable pins 180. One end of the wire 68 is secured to the terminal 176 by a nut 182.

When the automobile is in motion, the switch 12 is normally closed, thereby establishing an electrical circuit through the magnets 36 and 38 and a parallel electrical circuit through the resistance 24. The gear 14 rotates in unison with the vehicle wheels and drives the magnet shaft 74 which in turn rotates the magnet 86. The rotating field created by the magnet 86 tends to rotate the speed cup 98 in the same direction as the magnet 86, and the strength of this tendency is directly proportional to the speed of rotation of the magnet 86. Rotation of the speed cup 98 and its associated shaft 100 is resisted by spring 140, with the result that the speed cup 98, shaft 100, and slider 54, assume positions which at all times correspond to the speed of rotation of the magnet 86 and therefore to the speed of travel of the vehicle.

When the slider 54 is located centrally of the resistance 24, no current passes through the slider circuit and the same current passes through both magnets 36 and 38. Each of these magnets therefore attracts its armature with the same force, and the pointer 30 indicates a speed corresponding to approximately half the ultimate speed of the vehicle or forty-four miles an hour, as shown in the drawings. When the speed of the vehicle is such that the slider 54 is moved toward one end of the resistance 24, a greater current passes through one of the magnets 36 and 38 than passes through the other magnet. The magnet receiving the strongest current exerts the greatest force upon its armature and draws a larger cross-sectional part of this armature into the magnet, at the same time withdrawing the other armature from its magnet. This movement of the armatures and the pointer shaft continues until the shifting of the armatures compensates for the difference in magnet currents, whereupon the pointer shaft and pointer come to rest and indicate the speed of the vehicle which corresponds to the particular relationship of the magnet currents then existing.

The rotation of the magnet shaft 74 rotates cross-shaft 164 and stub-shaft 170. The latter shaft carries the movable contact 172 of the switch 70 and each time the stub-shaft 170 rotates the circuit through switch 70 and magnet 64 is closed and again broken. Each complete rotation of stub-shaft 170 corresponds to a definite increment of distance, such, for example, as one-thirtieth of a mile of distance traveled by the automobile. The ratchet wheel 184, which rotates the mileage indicating drum 60, is given a corresponding number of teeth, this ratchet wheel having thirty teeth in the example selected. Each energization of the magnet 64 causes the pawl 62 to advance the ratchet wheel and drum one tooth so that for each thirty revolutions of the stub-shaft 170 the drum 60 is rotated one complete revolution.

While we have described and illustrated only one embodiment of our invention, it is to be understood that our invention is not limited to the specific details shown in the drawings but may assume various forms, and that the scope of our invention is limited solely by the following claims.

We claim:

1. An electric speedometer comprising an indicator, armature means for moving said indicator, a pair of opposed electromagnets for moving said armature means in opposite directions, means for providing said magnets with currents having variable relationships, a part rotating in definite relationship to the speed of a vehicle, and magnetically-controlled mechanism operated by said part for controlling said last-named means.

2. In an electric speedometer of the class described, the combination of an indicator, armature means for shifting said indicator, opposed electromagnets for moving said armature means in opposite directions, means for supplying current to said electromagnets, means for varying the relative strengths of the currents passing through said magnets, a part rotating at a speed proportional to the speed of a vehicle, and a magnetic coupling between said part and said current varying means.

3. In an electric speedometer of the class described, the combination of an indicator, electromagnetic means for operating said indicator, said means including a pair of opposed magnets, a source of electromotive force for said magnets, a part rotating at a speed always directly proportional to the speed of a vehicle, and magnetic means operated by said part for varying the relative strengths of said magnets.

4. In an electric speedometer of the class described, the combination of an indicator, opposed electromagnets for moving said indicator in opposite directions in accordance with the speed of a vehicle, said electromagnets being connected in series, a resistance in parallel with said magnets, a slider for said resistance in electrical communication with the connection between said magnets, and magnetic means for shifting said slider in conformity with the speed of said vehicle.

5. In an electric speedometer of the class described, the combination of an indicator, a pair of opposed electromagnets for shifting said indicator, a variable resistance for varying the values of the currents passing through said magnets, a rotatable, permanent magnet whose speed of rotation varies with the speed of said vehicle, and means operated by said permanent magnet for varying said resistance.

6. An electric speedometer comprising an indicator, a pair of opposed electromagnets for moving said indicator, a support, a shaft journalled in said support, means rotating said shaft in direct proportion to the speed of a vehicle, a permanent magnet rotated by said shaft, an iron field plate enclosing said magnet, a speed responsive element interposed between said permanent magnet and said plate, means resisting rotation of said speed responsive element, a resistance carried by said field plate, a slider movable with said speed responsive element, and connections between said slider and resistance and said electromagnets for varying the relative strengths of said electromagnets in proportion to the vehicle speed.

7. In an electric speedometer of the class described, the combination of a casting, a shaft journalled therein, means for rotating said shaft in proportion to the speed of a vehicle, a permanent magnet rotated by said shaft, a speed cup adjacent said magnet and tending to rotate therewith, means resisting rotation of said speed cup, a resistance, a slider for said resistance movable with said speed cup, an indicator, a pair of opposed electromagnets for moving said indicator, and connections between said electromagnets and said resistance and slider whereby the relative strengths of said electromagnets vary with the position of said slider.

8. An electric indicator of the class described comprising indicating means, a rotatable shaft, and means for varying the position of said indicating means to conform to variations in the speed of rotation of said shaft, said means including a permanent magnet driven by said shaft, means tending to rotate with said magnet, a spring restraining said means, a current regulator controlled by said means, and electromotive means actuated thereby for shifting said indicating means.

9. In an electric indicator of the class described, the combination of indicating means, electromotive means for actuating said indicating means, said electromotive means including armature means having opposed tapered portions, an electromagnet cooperating with each tapered portion, said electromagnets acting to move said armature means in opposite directions, and control means for said electromotive means, said control means including a variable resistance, and magnet operated means for varying said resistance in conformity with the speed variations of a vehicle.

10. In an electric speedometer of the class described, the combination of an indicator, electromagnetic means for shifting said indicator, and means including a permanent magnet and means in circuit with said electromagnetic means and controlled by said permanent magnet both enclosed in a unitary housing for varying said electromagnetic means in conformity with the speed variations of a vehicle.

11. An electric indicator of the class described, comprising indicating means, a pair of opposed electromagnets for shifting said means, a casting, a shaft journalled therein, means for driving said shaft in conformity with the speed of a vehicle, a permanent magnet rotated by said shaft, a speed cup influenced by said magnet, a variable resistance controlled by said speed cup, connections between said resistance and said magnets, and a cover attached to said casting for securing said speed cup and resistance thereto.

12. In an indicator of the class described, the combination of indicating means, electromagnetic means for moving said indicating means, a housing comprising a casting and cover secured thereto, a rotatable magnet in said housing, a shaft for rotating said magnet in conformity with the speed of a vehicle, a speed cup influenced by said magnet, a field plate in said housing, said speed cup located between said magnet and said field plate, a resistance carried by said field plate, a slider movable with said speed cup, connections between said resistance and slider and said electromagnetic means to vary the latter in conformity with the variable speeds of said shaft, and means whereby said cover secures said speed cup and field plate to said casting.

13. An electric speedometer of the class described, comprising a base, a cover removably secured thereto, said base and cover forming an enclosed housing, a variable speed shaft extending into said housing, a magnet rotated by said shaft, a combined bearing support and oil shield enclosing said magnet, a bearing carried by said bearing support and oil shield, a shaft mounted in said bearing, a member carried by said shaft and influenced by said magnet to rotate therewith, current varying means controlled by said shaft, means providing a second bearing for said shaft, means whereby said cover secures said bearing supporting means to said base, indicating means, electromagnetic means for shifting said indicating means, and electrical connections between said electromagnetic means and said current varying means whereby said indicating means accurately indicates the speed of said shaft.

14. In an electric indicator of the class described, the combination of a base, a magnet adjacent said base, means for rotating said magnet at variable speeds, a cup-shaped bearing support enclosing said magnet and engaging said base, a second bearing support engaging said base and spaced from said first-mentioned bearing support, bearings carried by said bearing supports, a shaft rotatably mounted in said bearings, a speed-responsive element mounted on said shaft, means for resisting rotation of said shaft, current varying means controlled by said shaft, means for attaching said bearing supports to said base, indicating means, current controlled means for shifting said indicating means, and connections between said current controlled means and said current varying means.

15. In an electrical indicator of the class described, the combination of a base, a magnet adjacent said base, means for rotating said magnet at different speeds, a cup-shaped field plate secured to said base, a resistance carried by said field plate, a bearing carried by said field plate, a bearing support mounted on said base, a bearing carried by said support, a shaft rotatably mounted in said bearings, a speed responsive element carried by said shaft and influenced by said magnet, said speed responsive element being located between said magnet and said field plate, a slider carried by said shaft for cooperation with said resistance, a spring carried by said field plate for resisting rotation of said shaft, a cover attached to said base and enclosing said resistance, slider, shaft, bearings, magnet, field plate and bearing support, electrical terminals carried by said cover, means connecting said terminals with said resistance and slider, respectively, indicating means, electrically operated means for shifting said indicating means, and connections between said electrically operated means and said terminals whereby said indicator indicates the speed of rotation of said magnet.

16. An electric speedometer of the class described, comprising a casting adapted to be attached to the transmission housing of an automobile, a shaft rotatably mounted in said casting and adapted to extend into said transmission housing and driven from a rotating member therein, a permanent magnet rotated by said shaft, a field plate spaced from said magnet, a resistance carried by said field plate, speed responsive means interposed between said magnet and field plate for varying said resistance, an oil shield protecting said speed responsive element and resistance against leakage of oil from said transmission, indicating means, electromotive means for actuating said indicating means, and connections between said electromotive means and said resistance to vary the position of said indicating means in conformity with the speed of rotation of said shaft.

17. An electric speedometer of the class described including, in combination, a casting, one end of which is adapted to be attached to the transmission housing of an automobile and the other end of which constitutes a base, a shaft rotatably mounted in said casting, one end of said shaft extending into said transmission housing and driven from a rotating member therein, the other end of said shaft extending through said base, indicating means, a pair of electromagnets for actuating said indicating means, a resistance in circuit with said electromagnets, a slider cooperatively associated with said resistance for varying the relative strengths of said electromagnets, magnetic means rotated by the shaft for controlling the position of said slider, said resistance, slider and magnetic means being supported upon said casting and enclosed in a unitary housing, and means within said housing for preventing leakage of oil from said transmission housing into contact with said resistance and slider.

18. In an electric speedometer of the class described, the combination of an indicator, electromotive means for shifting said indicator, means for supplying current to said electromotive means, means for varying the relative strengths of the currents, a part directly connected to the transmission of a vehicle and rotating at a speed proportional to the speed of the vehicle, a magnetic coupling between said part and current varying means, and means interposed between said part and current varying means for preventing leakage of oil from the transmission into contact with said current varying means.

19. In an electric speedometer of the class described, the combination of an indicator, electromagnetic means for operating said indicator, said means including a pair of opposed magnets, a source of electromotive force for said magnets, and means including a resistance in circuit with said source and magnets, a slider controlling said resistance, a part rotating at a speed proportional to the speed of a vehicle, and a magnetic coupling between said part and slider, all housed in a unitary casing.

ARDEN W. LE FEVRE.
THOROLF PAUL.
GEORGE E. COXON.